(12) United States Patent
Fukuhara (10) Patent No.: US 8,080,898 B2
(45) Date of Patent: Dec. 20, 2011

(54) POWER CONTROL METHOD FOR SECONDARY BATTERIES

(75) Inventor: Motohiro Fukuhara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 954 days.

(21) Appl. No.: 12/045,210

(22) Filed: Mar. 10, 2008

(65) Prior Publication Data

US 2008/0224541 A1 Sep. 18, 2008

(30) Foreign Application Priority Data

Mar. 16, 2007 (JP) ................ 2007-068440

(51) Int. Cl.
*H02J 3/32* (2006.01)
*H02J 1/10* (2006.01)
*H02J 3/38* (2006.01)
*H02J 7/00* (2006.01)

(52) U.S. Cl. ............... 307/48; 307/44; 307/47; 320/101

(58) Field of Classification Search .................. 320/101; 307/43–48
See application file for complete search history.

(56) References Cited

U.S. PATENT DOCUMENTS 6,487,096 B1 * 11/2002 Gilbreth et al. ................. 363/35
6,577,103 B2 * 6/2003 Tanaka et al. .................. 320/116
6,747,370 B2 * 6/2004 Abe .................................. 307/66
7,701,087 B2 * 4/2010 Eckroad et al. .................. 307/46
7,855,467 B2 * 12/2010 Kawazoe et al. ................ 290/44

FOREIGN PATENT DOCUMENTS

JP 2002-349417 A1 12/2002
JP 2006-287998 A1 10/2006

* cited by examiner

Primary Examiner — Richard V Muralidar
(74) Attorney, Agent, or Firm — Burr & Brown (57) ABSTRACT

There is provided a power control method for secondary batteries constituting, in a grid connection system supplying electric power to a power system by combining a power generator where output power fluctuates with a power storage compensator, the power storage compensator and compensating fluctuation of output power of the power generator. The method includes the steps of: dividing the secondary batteries into a "constant power control" group and a "demand responsive" group, and distributing predetermined constant input-output power out of power to be input and output provided to all the secondary batteries in order to compensate fluctuation of output power of the power generator to the "constant power control group" and the remaining input-output power to the "demand responsive" group to control input-output power of the secondary batteries respectively depending on the belonging groups.

11 Claims, 8 Drawing Sheets

POWER CONTROL METHOD FOR SECONDARY BATTERIES

BACKGROUND OF THE INVENTION AND RELATED ART STATEMENT

The present invention relates to a power control method for secondary batteries in a grid connection system supplying electric power to a power system by combining a power generator such as wind power generator whose output power fluctuates with a power storage compensator having plural secondary batteries.

In recent years, natural energy power generators (renewable power generator) generating electric power from wind power, solar light, geothermal heat, or the like, has been spotlighted and put to practical use. Since the renewable power generators are clean power generators which do not use the limited resources such as petroleum but use energy resources inexhaustibly present in nature and can inhibit carbon dioxide from being emitted, the number of companies, autonomies, and the like, which install renewable power generators is increasing from the viewpoint of prevention of global warming.

However, since the natural energy fluctuates every moment, a renewable power generator has an obstacle of inevitable fluctuation of output power toward spreading out. Therefore, when a renewable power generator is employed, it is preferable to construct a grid connection (power-generating) system where a renewable power generator is combined with a power storage compensator provided with plural secondary batteries as the main components in order to remove the obstacle.

Among secondary batteries, a sodium-sulfur battery has high energy density, high output power in a short time, and excellent high-speed response. Therefore, a sodium-sulfur battery is suitably used for compensating fluctuation possibly caused in the order from several hundreds millisecond to several seconds of output power of a renewable power generator. In other words, it could be said that a grid connection system where a renewable power generator is combined with a power storage compensator having plural sodium-sulfur batteries as the components is a desirable power-generating system.

There seems to be no prior art aiming to solve the same problem described below as that of the present invention.

However, a grid connection (power-generating) system where a renewable power generator is combined with a power storage compensator provided with plural secondary batteries as the main components has a problem as described below.

First, deviation between the actual state of charge (SOC) and a control value in each secondary battery should be eliminated or reduced. In general, the state of charge of the secondary battery can be obtained and controlled by measuring a battery current during charging and discharging in a control apparatus such as a programmable controller and adding to or deducting from (for example, adding during charging and deducting for discharging) the state of charge set in the initial stage, followed by integrating. In this process, analog/digital conversion of the measured battery current is executed, and inevitable small error is generated by every conversion process. The error is prone to increase as the number of the addition, deduction, and integration increases. On the other hand, the secondary batteries combined with the renewable power generator to constitute a grid connection system play a role of flattening (fixing) total generated power as a grid connection system by compensating frequently fluctuating output power of the renewable power generator. Therefore, fluctuation of input-output power of each secondary battery is frequently caused, and therefore the number of deducting, adding, and integrating increases to enlarge the error, which may cause large deviation between the actual state of charge and the control value. When there is deviation between an actual state of charge and a control value in a secondary battery, there arises a problem of a sudden stop charging to preclude continuation of charge or a sudden stop discharging to preclude continuation of discharge, which causes a halt in the middle of compensation for output fluctuation of the renewable power generator. Therefore, it is important to eliminate or reduce deviation between the actual state of charge and the control value in each secondary battery.

In order to control the state of charge of each of the secondary batteries constituting the power storage compensator with good accuracy in a grid connection system, it is necessary to, for example, discharge the battery to the discharge end on a regular basis and charge to the charge end as necessary to correct or reset the control value of the state of charge. However, a secondary battery at very discharge end cannot be used for compensating fluctuating power in the discharge direction until a fixed amount of charge is completed. Likewise, a secondary battery at very charge end cannot be used for compensating fluctuating power in the charge direction until a fixed amount of charge is completed. Therefore, it is impossible to allow all the secondary batteries to be at very discharge end or at very charge end at the same time. Therefore, one of the themes is how each of the secondary batteries is allowed to be at very discharge end or at very charge end to correct or reset the control value of the state of charge.

From another viewpoint, particularly when the secondary battery is a sodium-sulfur battery, another theme is to provide a means to operate the sodium-sulfur battery effectively regardless of the conditions of the output power of the renewable power generator. For example, when output power of the renewable power generator is large and there is a small difference between the output power and an operation plan value of the total generated power as a grid connection system, output power of each sodium-sulfur battery will be reduced. In such a case, since the heat generation inside the battery modules is rather small by low power discharging, an auxiliary equipment (heater) loss increases to cause inefficient operation as a sodium-sulfur battery. Since it is preferable that output power of the renewable power generator is high as a grid connection system, a means to operate the sodium-sulfur battery effectively is desired even in this case.

The present invention has been made in view of such circumstances. As a result of study for a long period, the above problem was solved by the following means.

SUMMARY OF THE INVENTION

According to the present invention, there is provided a power control method for secondary batteries constituting, in a grid connection system supplying electric power to a power system by combining a power generator whose output power fluctuates with a power storage compensator, the power storage compensator and compensating fluctuation of output power of the power generator; the method comprising the steps of:

dividing the secondary batteries into a "constant power control" group and a "demand responsive" group, and:

distributing predetermined constant input-output power out of power to be input and output provided to all the secondary batteries in order to compensate fluctuation of output power of the power generator to the "constant power control" group and the remaining input-output power to the "demand responsive" group to control input-output power of the secondary batteries respectively depending on the belonging group.

In a power control method for secondary batteries of the present invention, it is preferable that the secondary batteries divided into the "constant power control" group and the "demand responsive" group are interchanged.

An interchange of the "constant power control" group and the "demand responsive" group may be conducted every regular period or according to the conditions of the secondary batteries. For example, the secondary batteries may be rotated between the "constant power control" group and the "demand responsive" group about every week. The interchange of the secondary batteries enables to extend the allowable time up to enlargement of error of the state of charge and prevent the batteries from a biased usage caused by belonging a specific secondary battery group. Upon the interchange, all the secondary batteries belonging to one group may be moved to the other group. Alternatively, an order of priority may be fixed to each secondary battery, or the secondary batteries may be subjected to grouping different from the above groups to move each subgroup from one group to the other group by each subgroup.

In a power control method for secondary batteries of the present invention, it is preferable that the numbers of the secondary batteries belonging to the "constant power control" group and the "demand responsive" group are changed.

In a power control method for secondary batteries of the present invention, it is preferable that the "demand responsive" group is further divided into a "delay responsive" group and an "instant responsive" group, that input-output power subjected to a primary delay filter process out of the power to be input and output provided to the "demand responsive" group is distributed to the "delay responsive" group, and that the remaining input-output power is distributed to the "instant responsive" group to control input-output power of the secondary batteries respectively depending on the belonging group ("delay responsive" group and "instant responsive" group).

The "delay responsive" group is a control group required to obtain the "instant responsive" group. By deducting a control amount having delay in a certain time constant, a control amount of the "instant responsive" group can be extracted.

In a power control method for secondary batteries of the present invention, it is preferable that the "delay responsive" group is further divided into plural groups (for example, "delay responsive" group A, "delay responsive" group B, "delay responsive group" C, . . . ) and that plural input-output powers subjected to a primary delay filter process with changing a time constant are distributed to each group (above mentioned "delay responsive" group A, "delay responsive" group B, "delay responsive" group C, . . . ) to control input-output power of the secondary batteries respectively depending on belonging group (above mentioned "delay responsive" group A, "delay responsive" group B, "delay responsive" group C, . . . )

In the present specification, to be subjected to a primary delay filter process (or to be subjected to a primary delay process) means to control and slow down the fluctuation in comparison with the state before the primary delay filter process is performed. Examples of the primary delay filter process include a process where a difference between the present value and the last value of the control amount distributed to the secondary batteries is multiplied by a time constant, and the values are integrated. Since the secondary batteries constituting a grid connection system with being combined with the renewable power generator play a role of flattening (fixing) total generated power as a grid connection system by compensating output power of the renewable power generator, which frequently fluctuates, fluctuation of input-output power of each secondary battery is prone to be frequent. However, if power to be input and output provided to the secondary batteries in order to compensate fluctuation of output power of the renewable power generator is subjected to a primary delay filter process, power having controlled and slowed fluctuation in comparison with the actual output power (or power to be compensated) of the renewable power generator can be obtained. The power is distributed to a "delay responsive" group. On the other hand, quickly fluctuating compensating power is distributed to an "instant responsive" group by deducting a compensation amount of the "delay responsive" group from power to be input and output provided to the secondary batteries in order to compensate fluctuation of output power of the renewable power generator.

In a power control method for secondary batteries of the present invention, it is preferable that an upper limit of the input-output power of each secondary battery is provided, differences between a value of power to be input and output provided to each secondary battery and the upper limit are summed up to obtain a total deficient power, and the total deficient power is redistributed to each secondary battery.

A power control method for secondary batteries of the present invention is suitably used in the case that the secondary batteries are sodium-sulfur batteries.

A power control method for secondary batteries of the present invention is suitably used in the case that the power generator where output power fluctuates is a renewable power generator using at least one of wind power, solar light, and geothermal heat.

A power control method for secondary batteries of the present invention is a power control method for plural secondary batteries constituting, in a grid connection system supplying electric power to a power system by combining a power generator where output power fluctuates with a power storage compensator, the power storage compensator. In the present specification, one secondary battery constituting plural secondary batteries means a secondary battery separated from the others by a control unit. One secondary battery is not determined by the number of electric cells, the number of module battery, output level, or the like. For example, in the case that the second batteries are sodium-sulfur batteries constituting the power storage compensator, sodium-sulfur batteries under the control of one bidirectional converter is treated as one sodium-sulfur battery. Though the secondary batteries (sodium-sulfur batteries) preferably have the same rating capacity, it is not necessarily the same.

In the present specification, output power may be expressed simply as output.

In a power control method for secondary batteries of the present invention, the secondary batteries are divided into a "constant power control" group and a "demand responsive" group, and predetermined constant power out of power to be input and output provided to all the secondary batteries in order to compensate fluctuation of output power of the power generator is distributed to the "constant power control" group and the remaining input-output power is distributed to the "demand responsive" group. The input-output power of the secondary batteries belonging to each group are controlled so that the secondary batteries belonging to the "constant power control" group always are allotted to input and output (charge and discharge) a constant power. Therefore, at least the secondary batteries belonging to the "constant power control" group can be allowed to be at very discharge end or at very charge end on a regular basis, and a control value of the state of charge can be corrected or reset at the discharge end or charge end. Consequently, the deviation between the actual state of charge and the control value is eliminated on a regular basis. As a result, there is no chance for a large deviation to be left intact. Thus, there hardly arises a problem of a sudden stop charging to preclude continuation of charge or a sudden stop discharging to preclude continuation of discharge of the secondary batteries, which causes a halt in the middle of compensation for output fluctuation of the renewable power generator.

Since, in a power control method for secondary batteries of the present invention, the secondary batteries divided into the "constant power control" group and the "demand responsive" group are interchanged in the preferable condition, it is possible to correct or reset the control value of the state of charge of all the secondary batteries. In addition, equalization of utility factor of plural secondary batteries can be attained.

Since, in a power control method for secondary batteries of the present invention, the number(s) of the secondary batteries belonging to the "constant power control" group and the "demand responsive" group is (are) changed in the preferable condition, energy amount of the secondary batteries can effectively be input and output according to the output fluctuation amount of the power generator.

Since, in a power control method for secondary batteries of the present invention, the "demand responsive" group is further divided into a "delay responsive" group and an "instant responsive" group, input-output power subjected to a primary delay filter process out of the power to be input and output provided to the "demand responsive" group is distributed to the "delay responsive" group, and the remaining input-output power is distributed to the "instant responsive" group to control input-output power of the secondary batteries respectively depending on belonging group (a "delay responsive" group and an "instant responsive" group) in the preferable condition; the secondary batteries belonging to the "delay responsive" group are subjected to a primary delay filter process (flattening and smoothing) to be assigned to input and output (to charge and discharge) power where fluctuation is controlled (slowed down) in comparison with output fluctuation of the renewable power generator. Accordingly, the secondary batteries belonging to the "delay responsive" group have the reduced number of deduction, addition, and integration of measured battery current during charging and discharging in calculation of the state of charge, and thereby the error according to the operation is reduced to reduce a deviation between the actual state of charge of the secondary batteries and the control value. Thus, there hardly arises a problem of a sudden stop charging to preclude continuation of charge or a sudden stop discharging to preclude continuation of discharge of the secondary batteries, which causes a halt in the middle of compensation for output fluctuation of the renewable power generator.

Since, in a power control method for secondary batteries of the present invention, the "delay responsive" group is further divided into plural groups, plural powers subjected to a primary delay filter process with changing a time constant are distributed to each group to control input-output power of the secondary batteries respectively depending on belonging group in the preferable condition; power having controlled (slowed down) fluctuation in comparison with the large output fluctuation of the renewable power generator is distributed to a larger number of the secondary batteries with compensating output fluctuation of the renewable power generator to be able to input and output (charge and discharge). This enables to reduce number of deduction, addition, and integration of measured battery current during charging and discharging in calculation of the state of charge with respect to a larger number of secondary batteries, and thereby the error according to the operation is reduced to reduce a deviation between the actual state of charge of the secondary batteries and the control value in the larger number of secondary batteries. Therefore, there hardly arises a problem of a sudden stop charging to preclude continuation of charge or a sudden stop discharging to preclude continuation of discharge of the larger number of secondary batteries, which causes a halt in the middle of compensation for output fluctuation of the renewable power generator.

Since, in a power control method for secondary batteries of the present invention, an upper limit of the input-output power of each secondary battery is provided, differences between a value of power to be input and output provided to each secondary battery and the upper limit are summed up to obtain a total deficient power, and the total deficient power is redistributed to each secondary battery; input and output can be controlled according to the conditions (value of the state of charge, etc.) of each secondary battery. Then, the entire secondary batteries constituting the power storage compensator play a role of compensating output fluctuation of the renewable power generator and can flatten (fix) total power-generated output as a grid connection system. Therefore, it enables compensation unaffected by the upper limit of assigned specific batteries or group(s)

According to a power control method for secondary batteries of the present invention, particularly in the case that the secondary batteries are sodium-sulfur batteries, the number of the sodium-sulfur batteries belonging to the "constant power control" group can be changed according to the difference between the total generated power as the grid connection system and the operation plan value. Since at least output power of the sodium-sulfur batteries belonging to the constant power control group does not decrease, heat generation inside the battery modules during discharging in the sodium-sulfur batteries can be obtained belonging to the "constant power control" group, and auxiliary equipment (heater) loss can be suppressed. Therefore, effective operation can be conducted in comparison with the case where the same control amount is distributed to all the sodium-sulfur batteries.

As the secondary batteries controlled by a power control method for secondary batteries of the present invention, it is possible to compensate output fluctuation of the renewable power generator continuously for a long period of time by a power storage compensator using, for example, sodium-sulfur batteries. Therefore, reliability upon long term operation of a grid connection system is remarkably enhanced.

According to a power control method for secondary batteries of the present invention, since an instant responsive group which does not contribute to an energy amount (kWh) can be set up with compensating fluctuation of the renewable power generator by the entire power storage compensator including the secondary batteries, even if capacity deterioration due to trouble of a secondary battery is caused, influence on the whole apparatus can be suppressed by allotting a deteriorated secondary battery to an "instant responsive" group. Therefore, a power storage compensator at a lower price can be built up, and redundancy (the number of redundant unit) can be suppressed as a grid connection system of a renewable power generator.

DESCRIPTION OF REFERENCE NUMERALS

1: power system
3: sodium-sulfur battery
4: bidirectional converter
5: power storage compensator
6: auxiliary equipment
7: wind power generator
8: grid connection system
9: transformer
31: proportional-integration controller
32: proportional controller
34: limiter
35: filter
36: filter
41: filter
42: limiter
43, 44, 45: limiter
46, 47, 48: divider
49: correction amount distributor
141, 142, 143, 145: power meter

DETAILED DESCRIPTION OF THE INVENTION

Hereinbelow, embodiments of the present invention will be described with referring to drawings. However, the present invention should not be construed with limiting to these embodiments, and various kinds of changes, modifications, improvements, and replacements may be added on the basis of those skilled in the art within the range of not deviating from the gist of the present invention. For example, though the drawings show suitable embodiments of the present invention, the present invention is not limited by the embodiments shown or information shown in the drawings. Upon carrying out or verifying the present invention, a means which is the same as or equivalent to the means described in the present specification can be applied. However, suitable means is a means described below.

Figure 1:
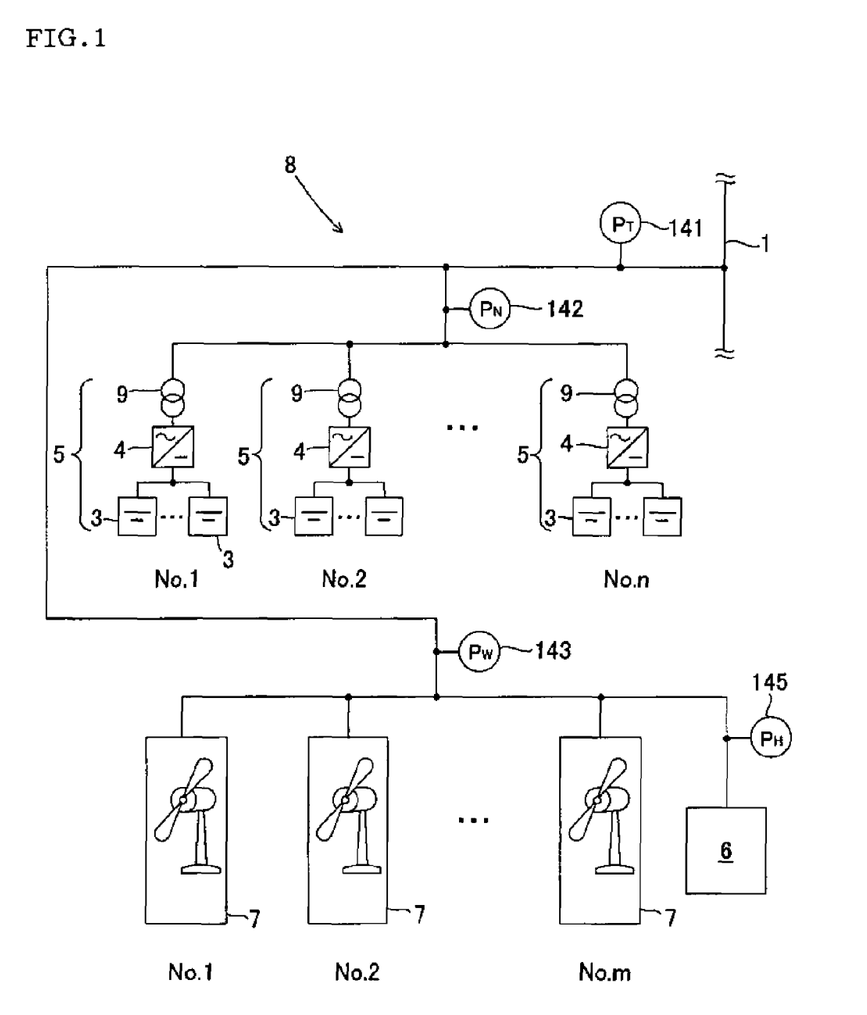
FIG. 1 is a system configuration diagram showing an example of a grid connection system having a power generator whose output fluctuates and a power storage compensator.

In the first place, a grid connection system will be described. The system configuration diagram shown in FIG. 1 shows an example of a grid connection system having a power generator whose output fluctuates and a power storage compensator. The grid connection system 8 shown in FIG. 1 has a wind power generator 7 (renewable power generator), which rotates a power generator by changing wind power into rotation of a windmill, and a power storage compensator 5. The power storage compensator 5 is provided with sodium-sulfur batteries 3, which are secondary batteries capable of storing and inputting-outputting power; a bidirectional converter 4 having a direct current/alternate current conversion function; and transformer 9. The bidirectional converter 4 is constituted by, for example, a chopper and an inverter or inverters.

The grid connection system 8 is provided with m lines from No. 1 to No. m (m is an integer larger than 1) of wind power generators 7 and n lines from No. 1 to No. n (n is an integer larger than 1) of sodium-sulfur batteries 3 (power storage compensator 5). The sodium-sulfur batteries 3 (power storage compensators 5) are divided into a constant power control group (having Z batteries) and a "demand responsive" group (having y+x batteries), and the sodium-sulfur batteries 3 allotted to the "demand responsive" group are further divided into a "delay responsive" group (having y batteries) and an "instant responsive" group (having x batteries) (x, y, and z refer to number of batteries).

The sodium-sulfur batteries 3 included in one power storage compensator 5 are treated as one sodium-sulfur battery 3 as a whole. In addition, generally, a private power generator is added to the grid connection system as a power generator. As a load, there are present a heater for the sodium-sulfur battery and other auxiliary equipment, which are omitted in the grid connection system 8. These may be considered to be included in (added to or deducted from) power generated by the power generator (wind power generator 7) whose output fluctuates.

In the grid connection system 8, discharge from the sodium-sulfur battery 3 is conducted in the power storage compensator 5. The power $P_N$ measured by the power meter 142 compensates the output fluctuation of power generated by the wind power generator 7 (power $P_W$ measured by the power meter 143 including power $P_H$ of the auxiliary equipment 6 measured by the power meter 145). Specifically, by controlling discharge of the sodium-sulfur battery 3 (i.e., power $P_N$) in such a manner that power output by the grid connection system 8 as a whole (power $P_T$ measured by the power meter 141) satisfies $P_T=P_W+P_N=$constant ($P_N=P_T-P_W$), power $P_T$ output by the whole grid connection system 8 (sometimes referred to as total power $P_T$) is made stable and highly qualified to supply to, for example, a power system 1 between a distribution substation and a power customer. Incidentally, the auxiliary equipment 6 includes a heater for the sodium-sulfur battery 3, a power source for control, and the like.

In the grid connection system 8, the sodium-sulfur battery 3 is charged in the power storage compensator 5 in accordance with the output fluctuation of power $P_W$ generated by the wind power generator 7. Specifically, by controlling charge to the sodium-sulfur battery 3 (i.e., power $-P_N$) in such a manner that the power $P_N$ measured by the power meter 142 satisfies $P_N=-P_W$, the fluctuating power $P_W$ is consumed, which enables to make the power $P_T$ output as the whole grid connection system 8 zero.

In both the case of discharging from the sodium-sulfur battery 3 and the case of charging to the sodium-sulfur battery 3, output fluctuation of the wind power generator 7 is absorbed by charging or discharging the sodium-sulfur battery 3 by changing a control amount (control target value) of the bidirectional converter 4 in such a manner that, in power storage compensator 5, power compensating output is input or output on the basis of the output (power $P_W$) from the wind power generator 7. Since stable highly qualified power can be supplied by using a natural energy generator (wind power generator 7) which hardly emits carbon dioxide and a sodium-sulfur battery 3 (power storage compensator 5), it may be said that the grid connection system 8 is a preferable power-generating system.

Figure 3:
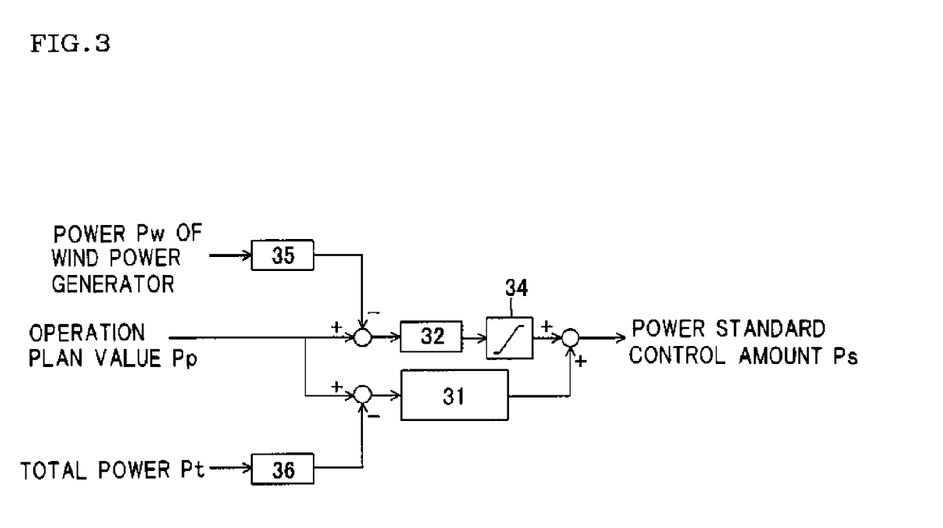
FIG. 3 is a block diagram showing logic for determining a power standard control amount with respect to the entire sodium-sulfur batteries (power storage compensator) in a grid connection system.

Next, with referring to FIGS. 3 and 4, a power control method for a sodium-sulfur battery 3 in the case that transaction power with the power system is made to be the operation plan value $P_P$ (set value) in the grid connection system 8 shown in FIG. 1 will be described. FIG. 3 is a block diagram showing logic for determining a power standard control amount $P_S$ with respect to the entire sodium-sulfur batteries 3 (power storage compensator 5) in a grid connection system 8. In addition, FIG. 4 is a block diagram showing logic for distributing a power standard control amount $P_S$ to each of the sodium-sulfur batteries 3.

As shown in FIG. 3, the power standard control amount $P_S$ can be obtained by adding a value subjected to cutting of a value not lower than a set value by proportional action by a proportional controller 32 and a limiter 34 on the basis of a value obtained by deducting the power $P_W$ generated by a wind power generator 7 from the operation plan value $P_P$ to a value subjected to proportional action and integral action by a proportional-integral controller 31 on the basis of a value obtained by deducting the total power $P_T$ at the present time (for obtaining the power standard control amount $P_S$) from the operation plan value $P_P$. The power standard control amount $P_S$ corresponds with power to be input-output provided to all the sodium-sulfur batteries 3 in order to compensate fluctuation of output of the wind power generator 7.

Figure 4:
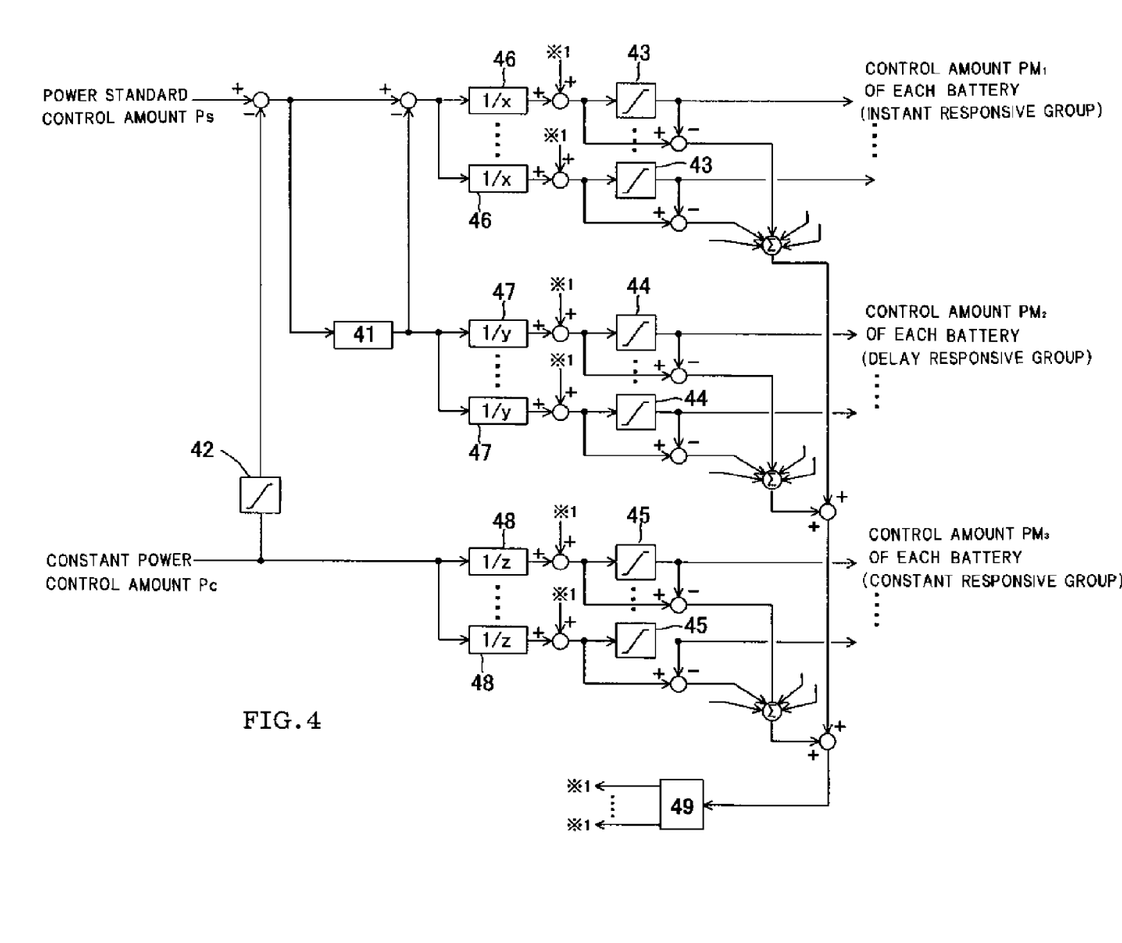
FIG. 4 is a block diagram showing logic for distributing a power standard control amount to each of the sodium-sulfur batteries 3.

The constant power control amount $P_C$ shown in FIG. 4 is a constant value set in advance. The constant power control amount $P_C$ is distributed to all the z sodium-sulfur batteries 3 belonging to the "constant power control" group. Then, the constant power control amount $P_C$ is further equally divided into z to allot 1/z to each by a divider 48. The battery control amount $P_{M3}$ after a value not lower than a set value is cut by a limiter 45 is allotted to each of the sodium-sulfur batteries 3 (strictly speaking, to a bidirectional converter 4 controlling the sodium-sulfur batteries 3) belonging to the "constant power control" group. The set value (upper limit) of the limiter 45 can be set individually for each control amount after the equal division into z to allot 1/z to each by the divider 48.

On the other hand, to the whole sodium-sulfur batteries 3 belonging to the y+x "demand responsive" group ("delay responsive" group and "instant responsive" group), a value (control amount) obtained by deducting the constant power control amount $P_C$ from the power standard control amount $P_S$ is distributed. Incidentally, upon deducting the constant power control amount $P_C$ from the power standard control amount $P_S$, the constant power control amount $P_C$ is previously subjected to cutting of the value not lower than a set value by a limiter 42. The limiter 42 is provided for the purpose of control because of the concern that the set value of the constant power control amount $P_C$ may exceed with respect to the z sodium-sulfur batteries 3 belonging to the "constant power control" group since the constant power control amount $P_C$ is a set value by an operator (user) of the power storage compensator 5. Since a compensation amount derails if the constant power control amount $P_C$ (set value) is deducted from the total compensation amount (power standard control amount $P_S$) in the case that the set value of the constant power control amount $P_C$ exceeds, it is controlled with the upper limit of the constant power control amount $P_C$ previously distributed to the z sodium-sulfur batteries 3 belonging to the "constant power control" group.

The control amount distributed to the "demand responsive" group is partially subjected to a primary delay process by a filter 41 (e.g., time constant of 60 seconds) and distributed to the entire y sodium-sulfur batteries 3 belonging to the "delay responsive" group. Further, the control amount distributed to the "delay responsive" group is equally divided into y to allot 1/y to each by a divider 47, and a value not lower than the set value is subjected to cutting by a limiter 44 to be allotted to each of the sodium-sulfur batteries 3 (strictly speaking, to a bidirectional converter 4 controlling the sodium-sulfur batteries 3) belonging to a "delay responsive" group as a battery control amount $P_{M2}$. The set value (upper limit) of the limiter 44 can be set individually for each control amount after the equal division into y to allot 1/y to each by the divider 47.

A value obtained by deducting the control amount distributed to the entire y sodium-sulfur batteries 3 belonging to a "delay responsive" group from the control amount distributed to the "demand responsive" group is distributed to the entire x sodium-sulfur batteries 3 belonging to the "instant responsive" group. The control amount distributed to the "instant responsive" group is further equally divided into x to allot 1/x to each by a divider 46, and a value not lower than the set value is subjected to cutting by a limiter 43 to be allot to each of the sodium-sulfur batteries 3 (strictly speaking, to a bidirectional converter 4 controlling the sodium-sulfur batteries 3) belonging to an "instant responsive" group as a battery control amount $P_{M1}$. The set value (upper limit) of the limiter 43 can be set individually for each control amount after the equal division into x to allot 1/x by to each the divider 46.

The distribution of control amount to the "delay responsive" group and the "instant responsive" group is determined in such a manner that the "instant responsive" group takes partial charge of 4000 kW when the wind power generator 7 has large fluctuation, for example, fluctuation of 4000 kW in a cycle of several seconds. By such a distribution, input-output power in the "constant power control" group and the "demand responsive" group ("delay responsive" group) can be controlled stably.

Since the limiter 45 is provided in calculation of a battery control amount $P_{M3}$ for the "constant power control" group, the battery control amount $P_{M3}$ (i.e., output value of the limiter 45) actually allotted to each of the sodium-sulfur batteries 3 after being subjected to the limiter 45 is sometimes smaller than the value obtained by equally dividing the control amount distributed to the entire z sodium-sulfur batteries 3 belonging to the "constant power control" group into z to allot 1/z to each by a divider 48 (i.e., input value of the limiter 45). The same is true in the "delay responsive" group (limiter 44) and the "instant responsive" group (limiter 43). Therefore, the total value of the difference between the input-value and the output-value of each of the limiters 43, 44, and 45 is calculated, and the total value is distributed again. The total value (control amount) corresponds with the shortfall of the control amount to be distributed to any of the sodium-sulfur batteries 3 by right. Specifically, the redistribution is performed by adding the total value to the input value of each of the limiters 43, 44, and 45 by a correction amount distributor 49. In the redistribution, it is preferable that the input value, the output value, and the set value (upper limit) are controlled from limiter to limiter to limiter in the correction amount distributor 49 (though it is not expressed in FIG. 4) to allot the total value to the input side of the limiter having a large set value with respect to the input value (to add the total value to the input value).

The redistribution is performed as follows. That is, input-output power of the sodium-sulfur batteries 3 belonging to the "constant power control" group and the "delay responsive" group in the "demand responsive" group sometimes runs short with respect to the entire compensation amount (power amount to be compensated, power standard control amount $P_S$), and the deficient control amount is naturally loaded to the "instant responsive" group in the "demand responsive" group. However, since each of the sodium-sulfur batteries 3 belonging to the "instant responsive" group has the upper limit, the entire compensation amount (power standard control amount $P_S$) cannot be controlled without redistribution. Therefore, by adding the deficient compensation amount to the first level control amount divided to each group, the deficient compensation amount is redistributed at a ratio of the upper limit of each unit to the first level control amount.

When the battery control amount $P_{M1}$, the battery control amount $P_{M2}$, and the battery control amount $P_{M3}$ are obtained to control the sodium-sulfur batteries 3 belonging to each group, the sodium-sulfur batteries 3 belonging the "constant power control" group charge and discharge regardless of fluctuation of power $P_W$ generated by the wind power generator 7. Therefore, with respect to the sodium-sulfur batteries 3 belonging to the "constant power control" group, it is possible to control so that the charge end or discharge end is caused by the setting of the constant power control amount $P_C$. For example, when the charge end approaches, voltage of the battery rises. Therefore, by detecting this phenomenon, it is possible to correct or reset the state of charge control value of the sodium-sulfur batteries 3 belonging to the "constant power control" group.

Figure 2:
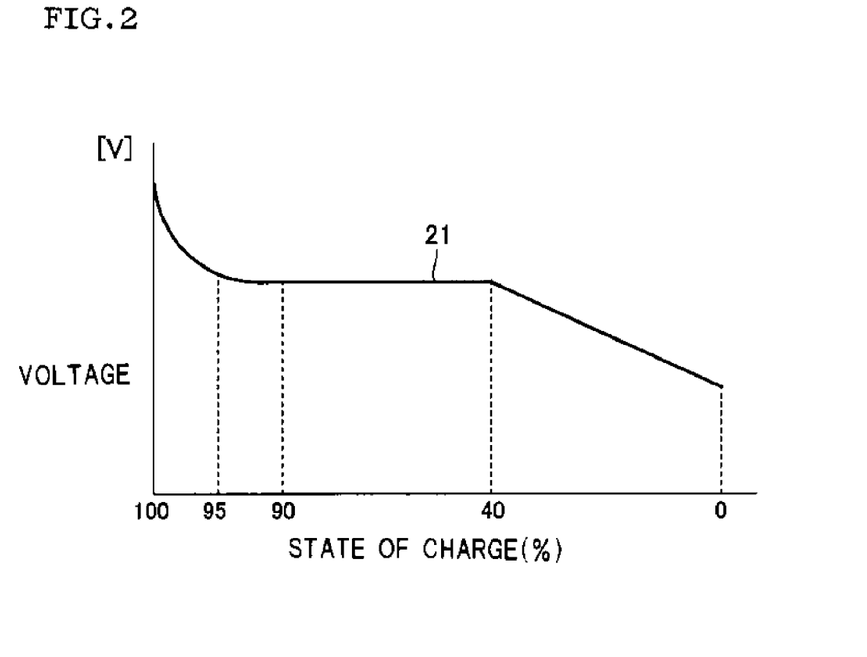
FIG. 2 is a graph showing correlation between state of charge (%) and voltage (V) of a sodium-sulfur battery.

FIG. 2 is a graph showing correlation between state of charge (%) and voltage (V) of a sodium-sulfur battery 30. As clear from the correlogram 21 shown in FIG. 2, voltage is kept constant regardless of the state of charge with the state of charge of around 40 to 90% as a (general) characteristic of a sodium-sulfur battery. Then, when charge proceeds to about 95% of the state of charge, the voltage rises. Therefore, by previously setting the relation between voltage reading and state of charge in the point where the voltage rises, it is possible to correct (reset) the state of charge control value when the charge proceeds to the voltage. Incidentally, since voltage changes (descends) also at the discharge end as shown in FIG. 2, it is possible to correct (or reset) the state of charge control value at the discharge end in the same manner.

On the other hand, the sodium-sulfur batteries 3 belonging to the "demand responsive" group ("delay responsive" group and "instant responsive" group) respond to fluctuation of power $P_W$ generated by a wind power generator 7 and charges or discharges so as to compensate the fluctuation. Therefore, generally, the sodium-sulfur batteries 3 belonging to the "demand responsive" group are controlled lest they should have the charge end or the discharge end.

Since a control amount subjected to a primary delay process by a filter 41 is distributed to the sodium-sulfur batteries 3 belonging to the "delay responsive" group in the "demand responsive" group, the sodium-sulfur batteries 3 belonging to the "delay responsive" group suppressively (with sluggish response) charge or discharge for the frequent fluctuation of power $P_W$ generated by the wind power generator 7. Therefore, the frequency of fluctuation of the input-output power is less than the frequency of increase and decrease of power $P_W$ generated by the wind power generator 7.

Since a control amount obtained by deducting a constant control amount (constant power control amount $P_C$ distributed to the "constant power control" group) and a control amount subjected to the primary delay process (control amount distributed to the "delay responsive" group) from power $P_W$ generated by the wind power generator 7, which fluctuates every moment, is distributed to the sodium-sulfur battery 3 belonging to the "instant responsive" group in the "demand responsive" group; the sodium-sulfur battery 3 belonging to the "instant responsive" group instantly charges or discharges for the power $P_W$ generated by the wind power generator 7, which fluctuates every moment. Therefore, the frequency of switching between charge and discharge is almost the same as the frequency of increase and decrease of power $P_W$ generated by the wind power generator 7.

By periodically interchanging the sodium-sulfur batteries 3 belonging to the "constant power control" group and the sodium-sulfur batteries 3 belonging to the "demand responsive" group, the state of charge control amount of all the sodium-sulfur batteries 3 can be corrected (reset). Specifically, it is preferable to arrange a rotation in such a manner that all the sodium-sulfur batteries 3 belong to the "constant power control" group, the "delay responsive" group, and the "instant responsive" group in order. At this time, upon switching from the constant power control group, it is desirable that the switching is not close to the charge end or discharge end in order to secure degree of freedom of charge and discharge.

EXAMPLE

Example 1

A grid connection system based on the grid connection system 8 shown in FIG. 1 was constructed to run a simulation of a power control method for secondary batteries of the present invention. Fifteen sodium-sulfur batteries each having a rated power of 2 MW (30 MW in total) and a wind power generator of a rated power of 51 MW were employed.

The operation plan value $P_P$ was changed on the time (section) basis to be set as in Table 1. The fifteen sodium-sulfur batteries were divided as shown in Table 2. With respect to the six sodium-sulfur batteries belonging to the "constant power control" group, the constant power control amount was distributed as shown in Table 2 on the time (section) basis.

TABLE 1

| No. | Section (Sec.) | Operation plan value $P_P$ (kW) |
| --- | --- | --- |
| 1 | 0-100 | 0 → 0 |
| 2 | 100-200 | 0 → 45000 |
| 3 | 200-500 | 45000 → 45000 |
| 4 | 500-600 | 45000 → 0 |
| 5 | 600-700 | 0 → 0 |

TABLE 2

| Group Name | Number of batteries | Parameter/setting |
| --- | --- | --- |
| "Instant responsive" group | 2 | — |
| "Delay responsive" group | 7 | Time constant 60 sec. |

TABLE 2-continued

| Group Name | Number of batteries | Parameter/setting | | |
|---|---|---|---|---|
| "Constant power control" group | 6 | Time table (program) | | |
| | | No. | Section (sec.) | Constant power control amount (kW) |
| | | 1 | 0-100 | −12000 → −12000 |
| | | 2 | 100-200 | −12000 → +12000 |
| | | 3 | 200-500 | +12000 → +12000 |
| | | 4 | 500-600 | +12000 → −12000 |
| | | 5 | 600-700 | −12000 → −12000 |

The time constant of the primary delay process (corresponding to the process which the filter 41 of FIG. 4 conducts) subjected to the control amount distributed to the seven sodium-sulfur batteries belonging to the "delay responsive" group was set to be 60 seconds (see Table 2). In addition, the time constant of the primary delay process (corresponding to the process which the filter 36 shown in FIG. 3 conducts) subjected to the total power $P_T$ was set to be one second, the time constant of the primary delay process (corresponding to the process which the filter 35 shown in FIG. 3 conducts) subjected to the power $P_W$ of the entire wind power generator was 0.1 second, the proportional band of the proportional controller (corresponding to the proportional controller 32 shown in FIG. 3) subjected to the value obtained by deducting the power $P_W$ generated by the wind power generator from the operation plan value $P_P$ was 40%, the proportional band of the proportional-integraration controller (corresponding to the proportional-integration controller 31 shown in FIG. 3) subjected to the value obtained by deducting the total power $P_T$ from the operation plan value $P_P$ was 75% and integration time was 100 seconds. Incidentally, in this simulation, the upper limit was not set in each limiter, and no limiter was allowed to function.

Figure 5:
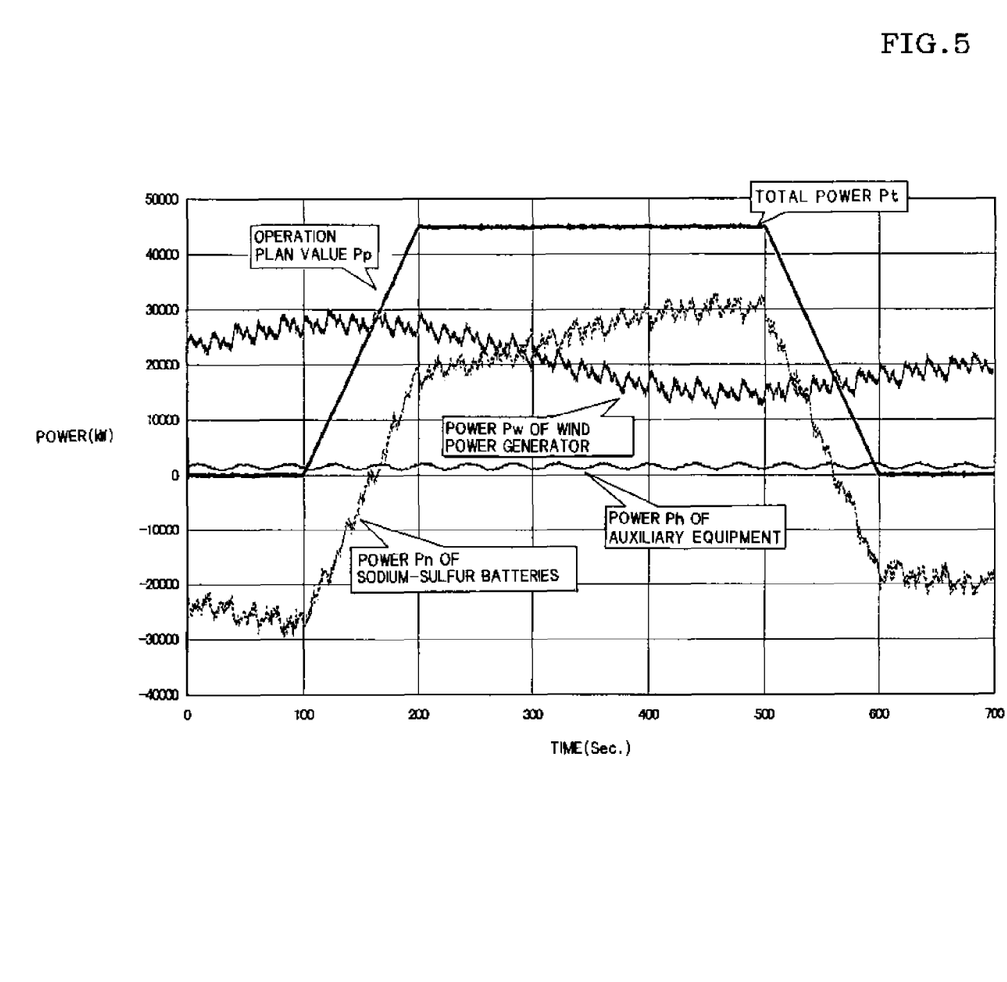
FIG. 5 is a graph showing results of simulation in Example and showing change in an operation plan value, total power, power of the whole sodium-sulfur batteries, power of the entire wind power generator, and power of the auxiliary equipment on a time (section) basis.
Figure 6:
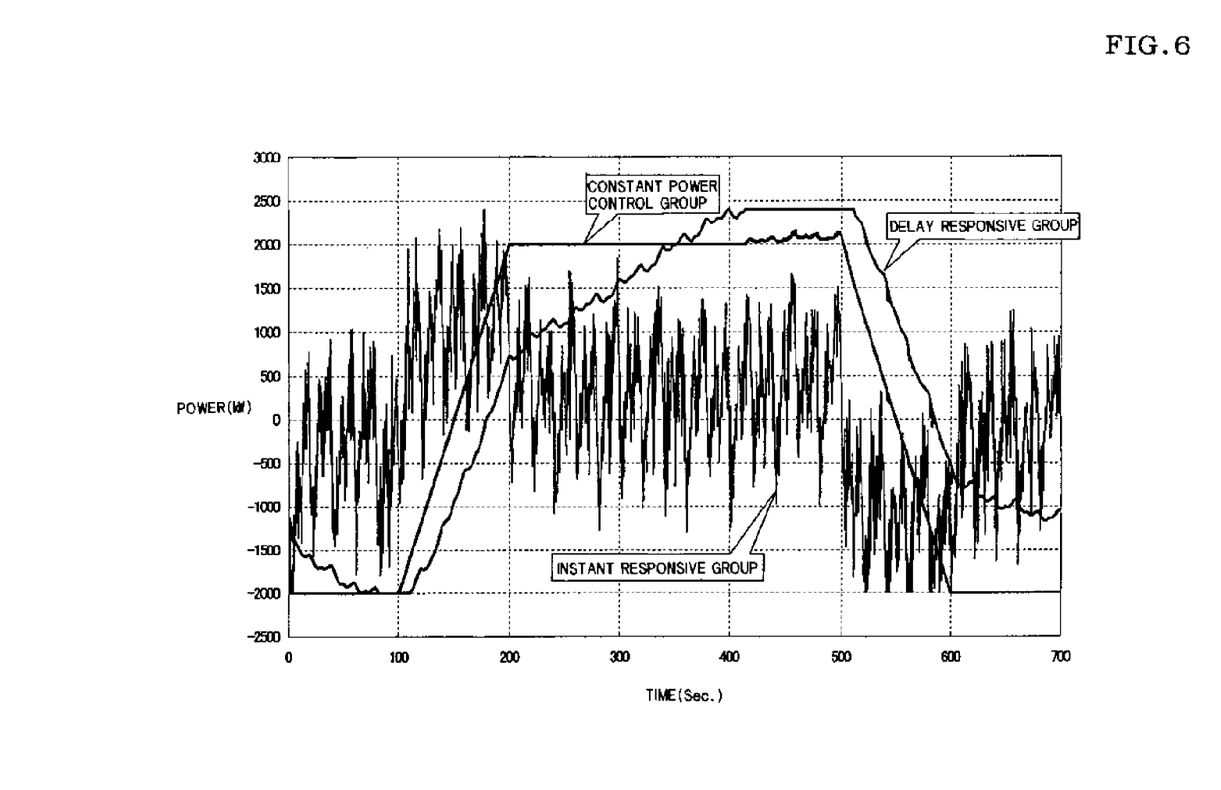
FIG. 6 is a graph showing results of simulation in Example and showing change in power of the sodium-sulfur batteries belonging to each of the "constant power control" group, "delay responsive" group, and "instant responsive" group on a time (section) basis.
Figure 7:
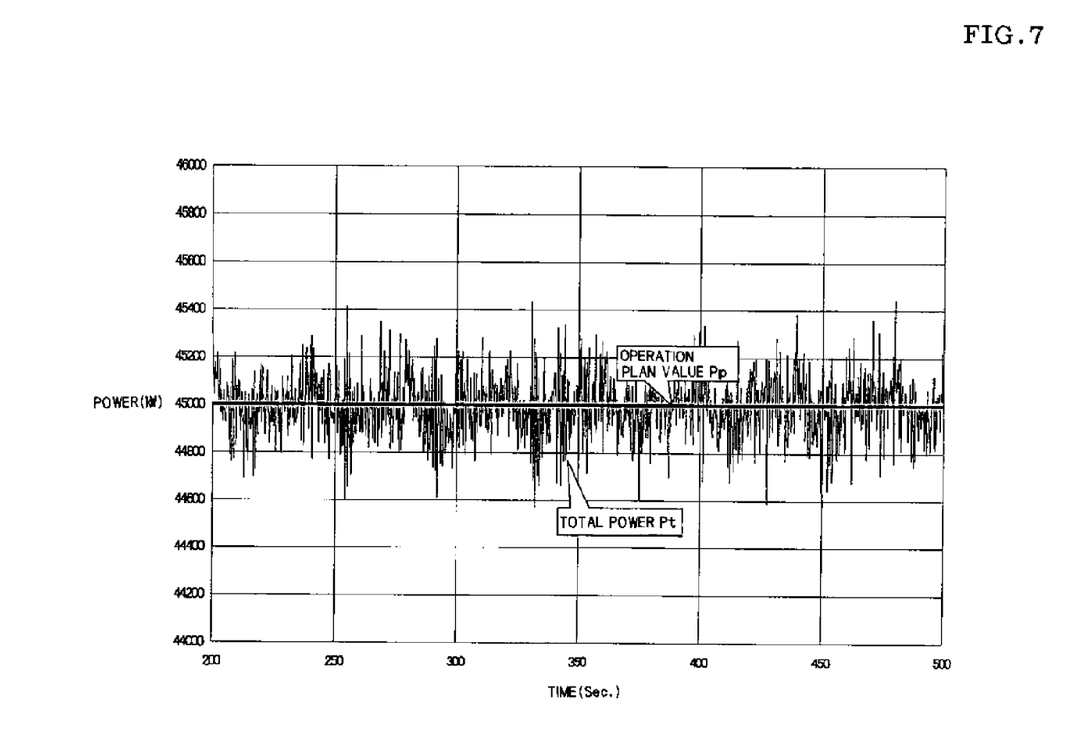
FIG. 7 is a graph showing results of simulation in Example and showing a difference between an operation plan value and total power for a certain time (section) of the operation plan value.
Figure 8:
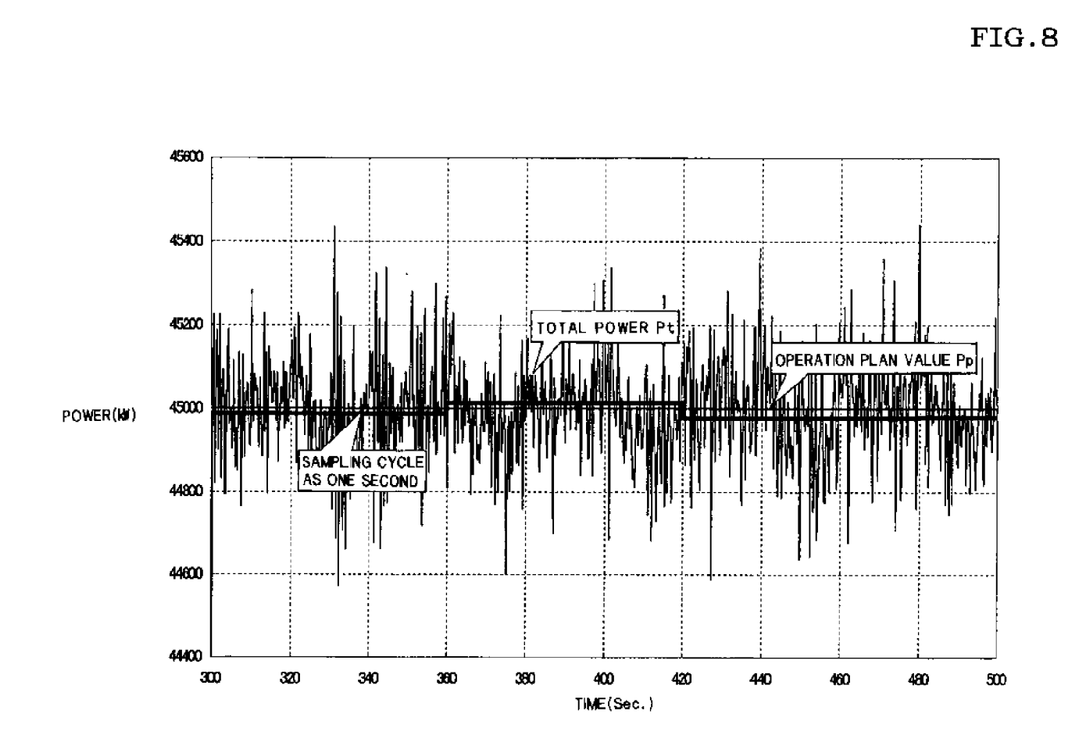
FIG. 8 is a graph showing results of simulation in Example and showing an evaluation on a difference (deviation) between an operating plan value and total power for a sampling cycle as one second.

FIGS. 5 to 8 show results of the simulation. FIG. 5 is a graph showing change in an operation plan value $P_P$, total power $P_T$, power $P_N$ of the entire sodium-sulfur batteries, power $P_W$ of the entire wind power generator, and power $P_H$ of auxiliary equipment on a time (section) basis. In addition, FIG. 7 is a graph showing a difference between an operation plan value $P_P$ and total power $P_T$ for a certain time (section) (see Table 2) with the operation plan value $P_P$ of 45000 kW, which was enlarged in comparison with FIG. 5. Further, FIG. 8 is a graph showing an evaluation on a difference (deviation) between an operating plan value $P_P$ and total power $P_T$ with a sectional average for one minute on a one-second sampling cycle. According to FIGS. 5, 7, and 8, it is understood that the difference between an operating plan value $P_P$ and total power $P_T$ is very small, which shows that the total power $P_T$ could be obtained almost equally to the operating plan value $P_P$.

FIG. 6 is a graph showing change in power of the sodium-sulfur batteries belonging to each of the "constant power control" group, "delay responsive group", and "instant responsive" group on a time (section) basis. According to FIG. 6, it is understood that power of sodium-sulfur batteries belonging to the "constant power control" group is constant, and that power of sodium-sulfur batteries belonging to the "instant responsive" group frequently fluctuates in response to change (see FIG. 5) of power $P_W$ of the entire wind power generator.

According to this simulation, total power $P_T$ can be obtained as the operation plan value $P_P$ as described above by control with six sodium-sulfur batteries out of 15 sodium-sulfur batteries being allowed to belong to the "constant power control" group and seven sodium-sulfur batteries out of 15 sodium-sulfur batteries being allowed to belong to the "delay responsive" group (having rather small fluctuation in comparison with the "instant responsive" group as shown in FIG. 6). From this, with respect to a large number (40%) of sodium-sulfur batteries of 6 out of 15, a deviation between the actual state of charge and the control value can be solved on a regular basis. In addition, since the operation can be performed with almost no reduction of output power of a large number of sodium-sulfur batteries of 13 (6+7) out of 15, heat generation inside the battery modules by discharging can be secured sufficiently. Therefore, it is understood that loss of an auxiliary equipment (heater) can be suppressed to realize effective operation.

INDUSTRIAL APPLICABILITY

A power control method for secondary batteries of the present invention can be used as a power control method for plural secondary batteries constituting the power storage compensator in a grid connection system supplying electric power to a power system by combining a power generator which uses natural energy such as wind power, solar light, and geothermal heat whose output power fluctuates with a power storage compensator.

What is claimed is:

1. A power control method for secondary batteries constituting, in a grid connection system supplying electric power to a power system by combining a power generator whose output power fluctuates with a power storage compensator, the power storage compensator compensating for fluctuations of output power of the power generator; the method comprising the steps of:

dividing the secondary batteries into a constant power control group and a demand responsive group, and distributing a predetermined constant input-output power out of power to be input and output provided to all the secondary batteries in order to compensate for the fluctuations of output power of the power generator to the constant power control group and the remaining input-output power to the demand responsive group to control input-output power of the secondary batteries respectively depending on the belonging groups, wherein the demand responsive group is further divided into a delay responsive group and an instant responsive group, input-output power subjected to a primary delay filter process out of the power to be input and output provided to the demand responsive group is distributed to the delay responsive group, and the remaining input-output power is distributed to the instant responsive group to control input-output power of the secondary batteries respectively depending on the belonging group, and wherein an upper limit of the input-output power of each secondary battery is provided, differences between a value of power to be input and output provided to each secondary battery and the upper limit are summed up to obtain a total deficient power, and the total deficient power is redistributed to each secondary battery.

2. The power control method for secondary batteries according to claim 1, wherein the secondary batteries divided into the power control group and the demand responsive group are interchanged.

3. The power control method for secondary batteries according to claim 1, wherein the number of the secondary batteries belonging to the constant power control group and the demand responsive group are changed.

4. The power control method for secondary batteries according to claim 2, wherein the number of the secondary batteries belonging to the constant power control group and the demand responsive group are changed.

5. The power control method for secondary batteries according to claim 1, wherein the delay responsive group is further divided into plural groups, plural input-output powers subjected to a primary delay filter process with changing a time constant are distributed to each group to control input-output power of the secondary batteries respectively depending on the belonging group.

6. The power control method for secondary batteries according to claim 2, wherein the delay responsive group is further divided into plural groups, plural input-output powers subjected to a primary delay filter process with changing a time constant are distributed to each group to control input-output power of the secondary batteries respectively depending on the belonging group.

7. The power control method for secondary batteries according to claim 1, wherein the secondary batteries are sodium-sulfur batteries.

8. The power control method for secondary batteries according to claim 2, wherein the secondary batteries are sodium-sulfur batteries.

9. The power control method for secondary batteries according to claim 3, wherein the secondary batteries are sodium-sulfur batteries.

10. The power control method for secondary batteries according to claim 4, wherein the secondary batteries are sodium-sulfur batteries.

11. The power control method for secondary batteries according to claim 1, wherein the power generator whose output power fluctuates is a renewable power generator using at least one of wind power, solar light, and geothermal heat.

* * * * *